United States Patent [19]

Moore

[11] 3,855,042

[45] Dec. 17, 1974

[54] PRESSURE POLISHED EXTRUDED POLYCARBONATE OR POLYSULFONE SHEET

[76] Inventor: Richard E. Moore, R.D. 1, Locust Grove Rd., West Chester, Pa. 19380

[22] Filed: Mar. 8, 1972

[21] Appl. No.: 232,725

Related U.S. Application Data

[62] Division of Ser. No. 54,185, July 13, 1970, Pat. No. 3,681,483.

[52] U.S. Cl. .............................................. 161/1
[51] Int. Cl. .............................................. B29d 7/22
[58] Field of Search .......... 161/1, 4, 408, 409, 402; 264/1, 210, 294, 322, 331, 319

[56] References Cited
UNITED STATES PATENTS

| | | | |
|---|---|---|---|
| 3,327,033 | 6/1967 | Kock et al. | 264/210 R |
| 3,470,291 | 9/1969 | Johnson | 264/292 |
| 3,504,075 | 3/1970 | Williams et al. | 264/210 R |
| 3,582,398 | 6/1971 | Ringler | 161/183 X |

OTHER PUBLICATIONS

Jennings, B. E., Def. Publ. of Ser. No. 753,838, filed Aug. 8, 1968, published in 8570G367 on Dec. 10, 1968, Defensive Publication No. T857,013.

*Primary Examiner*—Charles E. Van Horn
*Attorney, Agent, or Firm*—Max R. Millman, Esq.

[57] ABSTRACT

Pressure polished polycarbonate or polysulfone sheet substantially free of ripples, wiggles, extrusion die lines, and stresses and having a light transmittance greater than, a percentage haze lower than and a distortion lower than the as extruded sheet so that the polished sheet can be mechanically or thermoformed into such articles as airplane windshields, canopies, protective headgears and see-through enclosures requiring minimal wall thickness made by polishing the sheet between mirror finish plates using a sequence of preheating to the heat distortion temperature at zero or minimal pressure, heating to higher temperatures while rapidly increasing the pressure so as to transfer the mirror finish from the plates to the sheet surfaces, and cooling the sheet while decreasing the pressure to fix the mirror finish in the sheet surfaces as the sheet contracts and solidifies.

1 Claim, 6 Drawing Figures

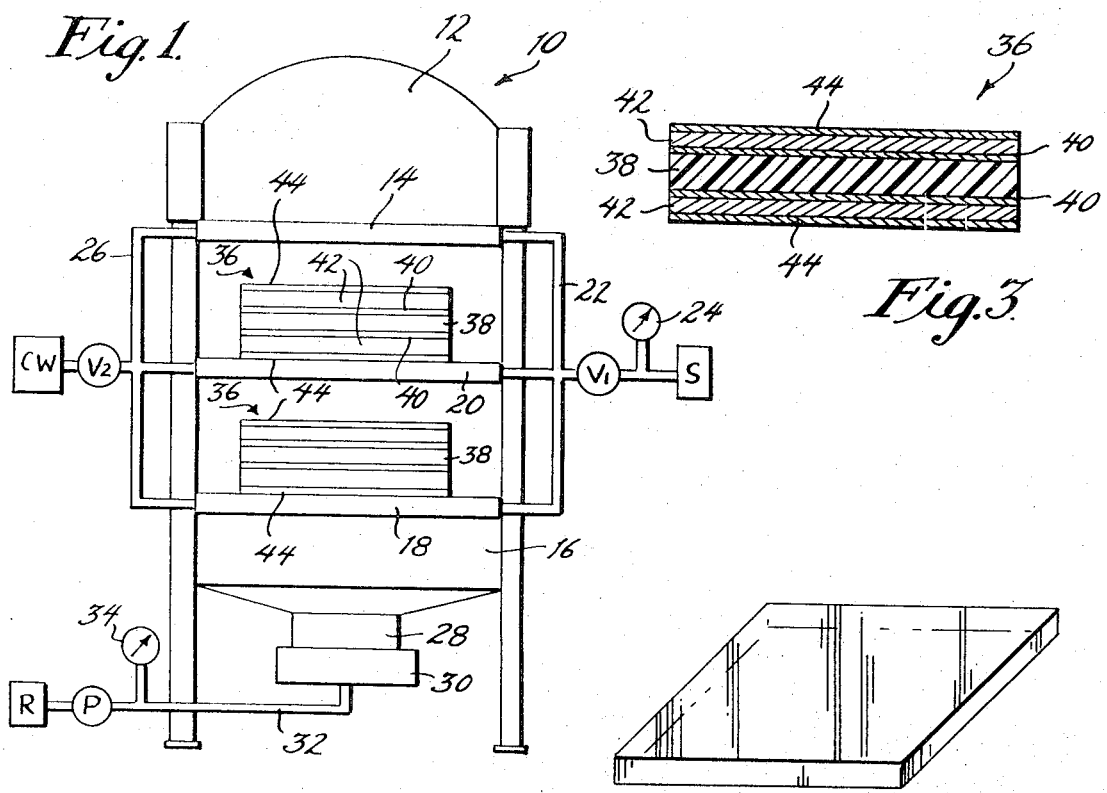
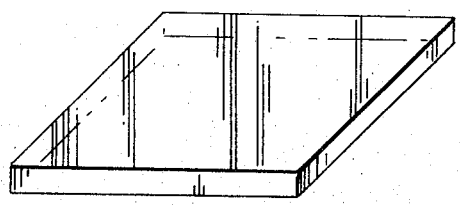
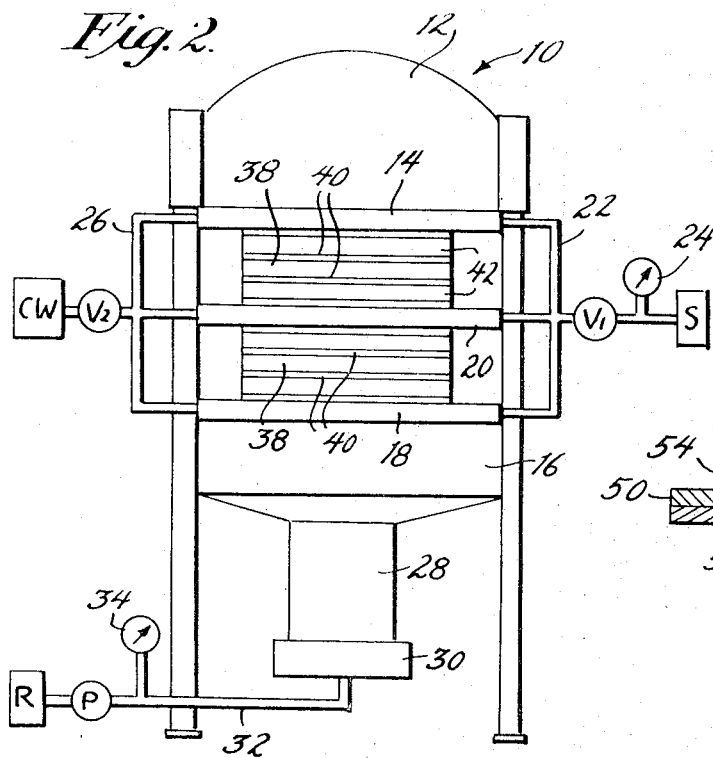
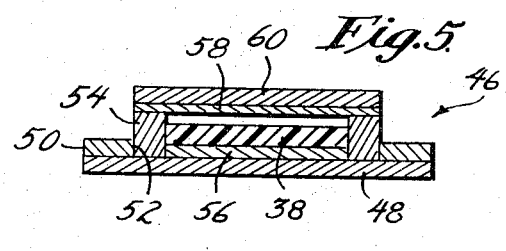

PRESSURE POLISHED EXTRUDED POLYCARBONATE OR POLYSULFONE SHEET

This invention relates to optical grade polycarbonate or polysulfone sheet and a method of pressure polishing the extruded sheet to produce the optical grade material and is a division of my copending application Ser. No. 54,185 filed July 13, 1970 now U.S. Pat. No. 3,681,483.

Polycarbonate resins are polyesters of carbonic acid and bisphenol A, are transparent and are well known for their high mechanical strength properties such as toughness, high impact strength and high tensile strength over a broad temperature range and non-shattering characteristics. They are extruded as sheets and as such contain ripples and extrusion die lines or stresses which cause undesirable optical properties such as relatively low luminous transmittance and a high percentage of haze. Polycarbonates do not lend themselves to removal of these ripples, blemishes, die lines, scratches or nicks by conventional grinding, buffing and polishing techniques.

Polysulfone resins are thermoplastic polymers composed of phenylene units linked by three different chemical groups, namely isopropylidene, ether and sulfone whose most distinctive feature is the diphenylene sulfone group. They are thermally stable, resistant to oxidation, rigid at elevated temperatures, tough, and have high impact and tensile strength over a broad temperature range. They are commercially available in many grades from companies such as Union Carbide. The sheets of polysulfone are generally extruded. Like the polycarbonates, the ripples and extrusion die lines or stresses are difficult to remove by conventional grinding and buffing techniques.

It is the primary object of this invention to provide an optical grade polycarbonate or polysulfone sheet having luminous transmittance better than, haze less than and distortion less than the as extruded sheet. Such material, being tougher than acrylics, vinyls, celluloses and other clear thermoplastics, and having desirable optical properties, can advantageously be used to fabricate, mechanically or by thermo-forming, airplane windshields, canopies, protective headgear and see-through enclosures requiring minimal wall thicknesses and the like.

Another object of the invention is to provide an efficient, accurate and reproducible method of making polycarbonate or polysulfone sheets with optical properties superior to the as extruded sheets using controlled stages of heat and pressure and mirror polished plates to eliminate substantially all of the ripples, wiggles and extrusion die lines and stresses, which produce the inferior optical properties of the as extruded sheets.

Another object of the invention is to provide a method of pressure polishing extruded polycarbonate or polysulfone sheets employing a sequence of first charging a press with the extruded sheet retained between plates of high mirror polish, then pre-heating the sheet slowly to its heat distortion temperature with little or no pressure applied so as to expel air entrapped between the sheet and the mirror polished plates, then rapidly raising the pressure to about 300-500 psi while the temperature rises to the fusion temperature at which time mirror surfaces are formed in the sheet and the ripples, wiggles and extrusion die lines and stresses are removed, and finally cooling the material slowly to about 150°F while cutting the pressure in half to retain the mirror polish on its surfaces while the material cools and solidifies. If the polycarbonate or polysulfone will eventually be thermo-formed into its final article, to eliminate molecular memory in which the surfaces of the plastic sheet may revert to their original form including the ripples, wiggles and extrusion die lines or stresses, the step of raising the temperature somewhat higher than the fusion temperature while reducing the pressure to prevent thinning is interposed between the fusion stage and the cooling stage.

These and other objects of the invention will become more apparent as the following description proceeds in conjunction with the accompanying drawings, wherein:

FIG. 1 is a diagrammatic view of a multi-platen press shown open and charged with the members required to initiate pressure polishing of the polycarbonate or polysulfone;

FIG. 2 is a view similar to FIG. 1 showing the press closed;

FIG. 3 is a sectional view through the unit to be charged into the press;

FIG. 4 is a perspective view of the final highly polished plastic sheet;

FIG. 5 is a sectional view of a modified unit to be charged into the press; and

Specific reference is now made to the drawings in which similar reference characters are used for corresponding elements throughout.

Figure 6:
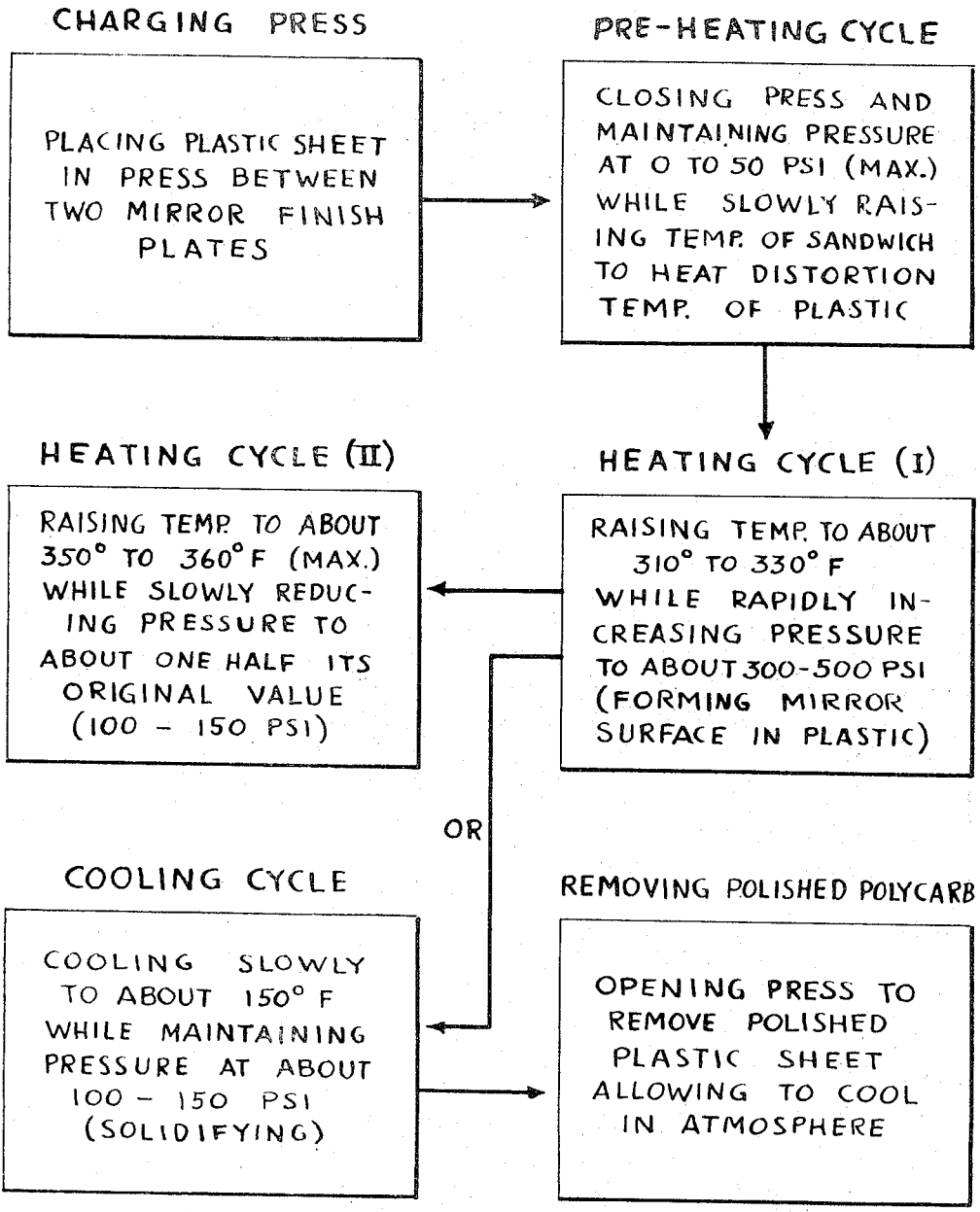
FIG. 6 is a flow diagram of the sequential process steps.

Polycarbonate resins which are polyesters of carbonic acid and bisphenol A are available in various grades commercially under such trademarks as Lexan (General Electric), Merlon (Mobay Chemical), etc. They have high tensile and impact strength over broad temperature range, are virtually shatter-proof and are extrudable as transparent sheets. Since the sheets contain ripples, wiggles, and extrusion die lines or stresses they do not possess desirable optical properties. Moreover, they cannot be readily ground, buffed and polished by conventional means to remove these ripples, die lines and other flaws.

Polysulfone resins are polymers composed of phenylene units linked by isopropylidene, ether and sulfone groups which have high impact and thermal strength and are extrudable as transparent sheets and as extruded contain ripples, wiggles and extrusion die lines or stresses that impair the optical properties of the sheet and are not readily polished by conventional grinding and buffing techniques.

The steam heated press 10 employed to carry out the process is conventional and generally comprises a head 12 having an upper platen 14 at its lower surface, a vertically movable bed 16 carrying a lower platen 18 and a plurality of vertically movable platens 20 (only one shown as illustrative) between the upper and lower platens defining between them the charging and polishing positions. The platens include interior coils which are connected by suitable couplings and flexible hoses 22 to a source S of steam under pressure via a valve $V_1$, there being a pressure gauge 24 in the line. The platens are also connected by suitable couplings and flexible hoses 26 to a source of cold water CW via an appropriate valve $V_2$.

The press is hydraulically operated from below by means of a ram 28 secured to the bed 16 and vertically movable in a cylinder 30. Appropriate conduits 32 connect the cylinder to a source of hydraulic fluid R via a pump P and a pressure gauge 34. The means to raise and lower the ram and thus close and open the press are well known and can involve a reversible pump P or a pair of pumps and separate hydraulic circuitry or equivalent means.

When the ram is retracted and the press is open as shown in FIG. 1, unit 36 of FIG. 3 is charged therein by placing each unit on a platen spaced from the adjacent upper platen. The unit 36 comprises an extruded sheet 38 of polycarbonate or polysulfone, a pair of upper and lower mirror polished plates 40 coextensive with and in face to face contact with the opposite surfaces of the plastic, a pair of upper and lower aluminum backer plates 42 in face to face contact with the mirror polished plates and a pair of upper and lower cardboard sheets 44 in face to face contact with the aluminum plates. When the unit is positioned in the press the lower cardboard object contacts one surface of each platen and when the press is closed, as shown in FIG. 2, the upper cardboard sheet of that unit 36 contacts the undersurface of the next upper platen.

The plate 40 is preferably a hard rolled brass press plate having a pressure resistance of about 64,000 psi, offering excellent resistance to deformation, made from a double spring hard special copper alloy with a clean alpha structure, i.e., only one kind of crystal, and is therefore capable of taking a mirror-like polish (National Electrical Association of the USA designation No. 8) without any visible polishing lines. To protect the mirror polished surface, the plate may be nickel plated with a layer of about 0.00032 inch or plated on the nickel with a layer of about 0.00008 inch chromium. Such a plate is commercially available as Wieland highly mirror polished press plates sold by Fabrite Metals Corporation, New York, N.Y. In place of the chrome mirror plate, a heat or chemically tempered glass with highly polished parallel surfaces can be used, or any other equivalent mirror finish plate, provided the same can withstand the pressures and temperatures employed in the process and any torque to which the plate may be subjected due to uneven closure of the platens.

The aluminum backer plates 42 are employed to protect the mirror polished plates 40 as well as to distribute the heat evenly over the plastic sheet 38 and to reduce imperfections which may exist in the flatness of the platens.

The cardboard sheets 44 are somewhat resilient and are used as good insulators to even out the heating and cooling of the plastic sheet 38 and to help level out high and low spots and thus prevent blisters.

Although the unit 36 is shown to be of lesser width than the platens, this is merely for illustrative purposes. The unit can desirably be coextensive with the platen.

For the pressure polishing of polycarbonate or polysulfone sheets up to three-eighths inch, there is not sufficient lateral flow under the conditions of pressure and temperature used in the process, as will appear hereinafter, to require that the plastic be laterally confined and hence the unit 36 will be charged into the press as such. However, such lateral flow may be encountered when the thickness of the sheet to be polished exceeds three-eighths inch, in which case lateral confinement is required and for this unit 46 shown in FIG. 5 is used. Thus the lower aluminum plate 48 is the base plate of a mold upon which an aluminum frame 50 is secured to provide a mold cavity 52 which is narrowed by the insertion of a frame 54 of compressible wood, such as pine, which extends above the aluminum frame 50. The lower mirror polished plate 56 is laid in the cavity against the base plate 48 and within the confines of the wooden frame 54 and the polycarbonate or plastic sheet 38 is placed on the lower mirror polished plate 56 also within the confines of the wooden frame. The thickness of the plastic sheet is such that its upper surface is beneath the upper edge of the wooden frame upon which is placed the upper mirror polished plate 58. Over the upper mirror polished plate is placed the upper aluminum backer plate 60. It is to be understood that when the unit 46 is charged into the press, upper and lower cardboard sheets 44 will be placed over the upper aluminum plate 60 and below the aluminum base plate 48 respectively.

The units 36 are charged in the press, and while only two such units are illustrated, it will be understood that many more can be employed for the simultaneous pressure polishing without impairing the efficiency and accuracy of the process. The press is then closed by activation of the pump P so that the ram 28 raises the bed 16 and all the platens save the upper 14, in which closure action the upper carboard sheets engage the undersurface of adjacent upper platens in each operative station, as seen in FIG. 2. Steam is admitted to the platens via the valve $V_1$ and the temperature is raised slowly while the pressure is maintained at zero (weight of the platens) up to 50 psi on the plastic sheet 38 as a maximum. The temperature to which the plastic sheet is raised is its heat distortion temperature which, by definition, is the temperature of the material when it begins to distort under a pressure of 66 psi. In the case of polycarbonate this temperature is about 270°F and the period over which such temperature is attained is about 30 minutes for ½ to ¾ inch material and in the case of polysulfone is about 320°F and is reached in about 45 minutes for similar thicknesses. In this preheat stage or cycle entrapped air is expelled between the mirror polished plates 40 and the aluminum plates 42 and causes even face to face contact of the mirror polished plates and the mating surfaces of the plastic sheet.

Where the unit 46 is used to laterally confine the plastic sheet at its heat distortion temperature, the closing of the press causes the wooden frame 54 to compress and the upper mirror polished plate 58 to contact the upper surface of the plastic sheet. The upper mirror polished plate is placed over the frame 54 and not directly on the plastic sheet for the reason that should splinters of wooden frame form during the compression thereof, they will embed in the edges of the plastic sheet without impairing the formed mirror surface and need merely be trimmed; whereas if the splinters lodged between the upper mirror polished plate 58 and the aluminum backer plate 60, the plate 58 would be dented and ultimately the mirror polish formed on the upper surface of the plastic sheet 38 would be marred.

In the next or heating stage, the pressure is raised rapidly to about 300 to 500 psi while the temperature is allowed to increase to about 310°–330°F. This temperature rise is obtained over a period of 10 to 20 minutes while the pressure is maintained at said value of 300 to 500 psi, depending upon the thickness of the plastic sheet. In this heating stage or cycle the mirror polish of the plates 40 is transferred to the plastic sheet while the ripples, wiggles, and extrusion die lines and stresses are substantially eliminated.

If the polished polycarbonate or polysulfone is destined for thermo-forming into final articles, then a second heating stage or cycle is used to destroy the molecular memory of the material so that the original ripples, wiggles, and extrusion die lines and stresses will not return upon fabrication. In this molecular memory-destroying cycle the material is raised to a temperature of about 350°–360°F while the pressure is slowly reduced to about half its original value as a maximum, and preferably 50 to 75 psi, over a period of about 20 minutes. This decreased pressure prevents excessive flow and thinning of the plastic sheet.

Thereafter the material is cooled slowly to about 150°F while maintaining the decreased pressure at a maximum of 150 psi and preferably 50 to 75 psi. The cooling stage is effected by shutting valve $V_1$ and opening valve $V_2$ to the cold water supply CW while maintaining the desired ram pressure. The cooling cycle is about 45 minutes. In the first several minutes thereof this low pressure is maintained, that is until the temperature drops about 10°F. Thereafter, the pressure on the material can be allowed to rise while the ram pressure control is turned off so that as the plastic sheet cools and contracts, the press pressure will drop accordingly.

If the polished polycarbonate or polysulfone will not be destined for fabrication into a final article by thermo-forming, then the second heating stage or cycle can be eliminated and the material which was subjected to a temperature of about 310°–330°F and a pressure of 300 to 500 psi is subjected directly to the cooling cycle.

After the press is opened and the polished plastic sheet is removed, it is allowed to cool slowly in the atmosphere. Because the surfaces of the pressure polished polycarbonate and polysulfone sheets are substantially free of ripples, wiggles and extrusion die lines or stresses, the polished sheets have greater luminous transmittance, lower haze and lesser optical distortion than the as extruded sheets and thus such pressure polished sheets can be used advantageously to fabricate such articles as airplane windshields, canopies, protective headgear and other enclosures requiring good see-through properties but minimal wall thickness. In the case of polycarbonate which was pressure polished by the process of the instant invention, the following comparative data was determined by ASTM Procedure C 1003-61 using ⅛ inch polished polycarbonate, ⅛ inch as extruded polycarbonate and ⅛ inch glass:

| Optical Property | Polished Polycarb. | As Extruded Polycarb. | Glass |
|---|---|---|---|
| Index of Refraction | 1.62 | 1.62 | 1.55 |
| Luminous Transmittance | 0.900 | 0.860 | 0.911 |
| % Haze | 0.7 | 2.6 | 0.0 |

Additionally to determine optical distortion, a grid pattern (1 inch squares) was photographed through optical flat glass, common window glass, standard extruded polycarbonate sheet and pressure polished polycarbonate sheet using a commercial 14 inch camera, f/6.3 stopped down to f/4.5 2 at 1 kw scoop lights, a camera to sample distance of 5 feet and a sample to grid distance of 11 feet. The results were that the pressure polished polycarbonate had considerably less distortion than the window glass but was not quite as distortion-free as the optical flat glass.

Thus it will be seen that the pressure polished polycarbonate has optical properties superior to those of the as extruded sheet and optical distortion approaching that of optical flat glass providing desirable see-through clarity and lack of distortion for many applications.

It should be noted that the superior optical properties also result from the fact that the outer surfaces of the sheet are rendered substantially parallel during the pressure polishing thereof. Additionally, the instant invention makes possible the formation of pressure polished polycarbonate sheets which exceed in thickness that of the as extruded polycarbonate sheets, which at present are limited to three-eighths inch.

While preferred embodiments of the invention have here been shown and described, it will be understood that minor variations may be made without departing from the spirit of the invention.

What is claimed is:

1. A pressure polished sheet of extruded, transparent unfilled polycarbonate whose opposed surfaces are substantially free of ripples, wiggles, extrusion die lines and stresses and whose luminous transmittance is greater than, its percentage haze less than and its distortion less than the as extruded sheet, said luminous transmittance being 0.900, said percentage haze being 0.7 and an index of refraction of 1.62, as measured with ⅛ inch extruded sheet, said sheet being made by first preheating the as extruded sheet between a pair of mirror polished plates at a pressure of zero to a maximum of 50 psi to the heat distortion temperature of the sheet to expel air entrapped between the sheet and the plates, then increasing the pressure to about 300 to 500 psi while allowing the temperature to rise to about 310°–330°F to transfer the mirror finish of the plates to the sheet surfaces while substantially eliminating the ripples, wiggles and extrusion die lines and stresses, and then cooling the sheet while reducing the pressure to fix the mirror finish in the sheet surfaces as the sheet contracts and solidifies.

* * * * *